United States Patent
Sato et al.

(10) Patent No.: US 7,089,410 B2
(45) Date of Patent: Aug. 8, 2006

(54) PROGRAM BOOT METHOD FOR HARD DISK CONTROLLER, HARD DISK CONTROLLER AND HARD DISK DRIVE, AND CONTROL PROGRAM FOR HARD DISK CONTROLLER

(75) Inventors: Keiichi Sato, Kawasaki (JP); Yasunori Izumiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 502 days.

(21) Appl. No.: 10/393,819

(22) Filed: Mar. 21, 2003

(65) Prior Publication Data
US 2004/0019776 A1    Jan. 29, 2004

(30) Foreign Application Priority Data
Jul. 26, 2002  (JP)  ............... 2002-218856

(51) Int. Cl.
G06F 15/177  (2006.01)
G11B 15/46  (2006.01)
(52) U.S. Cl. .................... 713/1; 360/73.07
(58) Field of Classification Search ............ 713/1; 360/73.07
See application file for complete search history.

(56) References Cited

U.S. PATENT DOCUMENTS 5,761,699 A * 6/1998 Hatanaka ............... 711/101
5,982,570 A * 11/1999 Koizumi et al. ......... 360/69
6,940,793 B1 * 9/2005 Yamashita et al. ..... 369/47.39

FOREIGN PATENT DOCUMENTS

JP    2001-344911    12/2001

* cited by examiner

Primary Examiner—Lynne H. Browne
Assistant Examiner—Eric Chang
(74) Attorney, Agent, or Firm—Greer, Burns & Crain, Ltd.

(57) ABSTRACT

Prior to the loading of a main program, the rotation speed of a disk provided in a hard disk drive is increased to a common rotation speed adapting to all types of hard disk drive. At the common rotation speed and a common recording density, a main program is read from a system area in the disk where the main program is recorded. The main program is written to a RAM provided in a hard disk controller. After control processing of the hard disk drive is handed over to the main program, the rotation speed of the disk is increased to a proper rotation speed for a device. This allows main programs to be loaded in a common way from disks provided in respective hard disk drives independent of the type thereof.

5 Claims, 6 Drawing Sheets (A)

(B)

PROGRAM BOOT METHOD FOR HARD DISK CONTROLLER, HARD DISK CONTROLLER AND HARD DISK DRIVE, AND CONTROL PROGRAM FOR HARD DISK CONTROLLER

BACKGROUND OF THE INVENTION

1. Field of the Invention

The present invention relates to a program boot method for a hard disk controller, a hard disk controller and a hard disk drive to which the method is applied, and a control program for a hard disk controller and, more specifically, it relates to a technology for allowing a hard disk controller to cope with a plurality of disk rotation speeds.

Hard disk drives have been increasing in speed year after year. Along with this trend, there arises a need to develop hard disk controllers to cope with increases in rotation speed of spindles and in recording density, in a very short period, with cost increase kept low as much as possible. This is because there has been a growing demand for lowering the cost of the whole hard disk drive through the years.

2. Description of the Related Art

FIG. 6 shows an example of a general configuration of a hard disk controller.

In a hard disk controller 410 shown in FIG. 6, a disk controlling section 411 intermediates exchange of control data on the operation of a hardware section, between a processor 412 and the hardware section which comprises a spindle motor 404 for rotating a disk 403, a servo motor 405 for moving a magnetic head 402, and a motor driving section 401 for controlling their operations. The disk controlling section 411 also relays processing of sending and receiving input and output data between the processor 412 and the magnetic head 402. The motor driving section 401 shown in FIG. 6 drives, in accordance with an instruction from the disk controlling section 411, the spindle motor 404 for rotating the disk 403 and the servo motor 405 for moving the magnetic head 402. As shown in FIG. 6, the hard disk controller 410 is provided with a mask ROM 413 storing therein a boot program and a RAM 414 to store therein a main program.

Further, in a system area (shown with hatchings in FIG. 6) of the disk 403 shown in FIG. 6, a main program for operating a hard disk drive in an optimal condition is recorded by a manufacturer of the hard disk drive before shipment of the device. As shown in FIG. 6, an outer peripheral portion of the disk 403 or a recording area of concentric shape in the radial direction of the disk 403 may be assigned to this system area, for example, in place of a central portion of the disk 403. Meanwhile, a user area of the disk 403 shown in FIG. 6 is an area that a user can freely use.

Upon power-on of the hard disk drive, the processor 412 starts processing required to boot the hard disk drive in accordance with the boot program stored in the mask ROM 413. First, an operation setup section 416 inputs an instruction for operating hardware such as the spindle motor 404, the servo motor 405 and so on into the disk controlling section 411, in accordance with associated procedures and data included in the boot program. In response to this, the disk controlling section 411 drives the spindle motor 404 and the servo motor 405 via the motor driving section 401, thereby rotating the disk 403 at an appropriate speed as well as moving the magnetic head 402 to the system area where the main program is recorded. Then, a program loading section 417 receives via the disk controlling section 411 the main program read from the disk 403 by the magnetic head 402, and writes the main program to the RAM 414.

After the main program is stored in the RAM 414 as described above, a normal operation section 418, in turn, controls operations of the disk controlling section 411 and an interface controller 415 in accordance with the main program stored in the RAM 414.

This main program includes adjustment data and so on suited to characteristics of hardware provided in an individual hard disk drive. Therefore, the hard disk drive cannot normally operate to achieve expected performance without the main program loaded in a manner as described above.

Conventionally, the system area and the user area are not divided on the disk 403 shown in FIG. 6, and servo controlling data equivalent to expected highest rotation speed and recording density of an operative hard disk drive is recorded thereon. Accordingly, the main program is recorded on the disk 403 at the above highest rotation speed and recording density as data recorded in the user area.

To correctly load the main program thus recorded on the disk 403, the operation setup section 416 needs to drive the motor driving section 401 via the disk controlling section 411, and to accelerate the rotation speed of the spindle motor 404 to the rotation speed at which the main program has been recorded.

For implementation of this operation setup section 416, the boot program stored in the mask ROM 413 has to include data indicating a rotation speed to which the spindle motor 404 should reach.

In the prior art, therefore, there has to be developed a dedicated boot program to a new rotation speed and recording density, or a new combination of a data table including data suitable for a new disk rotation speed and a general-purpose boot program, every time the rotation speed or the recording density of disks is improved. In addition, to install a mask ROM storing therein the new dedicated boot program or combination of the general-purpose boot program and the data table, a disk controller LSI with integrated circuits for implementing a hard disk controller has to be newly developed.

Besides, a hard disk controller is also developed which properly functions coping with a plurality of types of hardware operating at a plurality of different disk rotation speeds.

This hard disk controller incorporates a mask ROM on which a plurality of boot programs for a plurality of types of hardware having different rotation speeds and recording densities from each other. By switching these boot programs for use, one disk controller LSI copes with the plurality of types of hardware.

It is very disadvantageous to develop a new hard disk controller in keeping with improvements in hardware performance as described above because it requires not only a number of man-hour to develop boot programs for hardware of each different type but a number of man-hour required for inspection of every disk controller LSI with these boot programs installed therein.

On the other hand, in the case where a plurality of boot programs are stored in a mask ROM, developmental works for coping with a plurality of types of hardware can be integrated into a development work for one disk controller LSI. The boot program to be stored, however, is accordingly increased in size, requiring use of an expensive large-capacity mask ROM. In short, one disk controller LSI can cope with various types of hardware, on the other hand, the hard disk controller itself is greatly increased in cost. In addition, it is still necessary to develop boot programs adaptable to individual types of hardware as in the first mentioned measures.

The boot program's expected basic functions are to read a main program recorded on a disk and store it in a RAM provided in a hard disk controller, and to hand over processing to the main program. These basic functions are in common with all boot programs irrespective of the type of hardware.

Nevertheless, in the prior art separate boot programs are developed for every type of hardware. This is because it is assumed that individual hard disk drives are to read the main program from a disk at their attainable highest rotation speed and recording density which will educe their respective expected operative performance.

SUMMARY OF THE INVENTION

It is an object of the present invention to provide a program boot method for a hard disk controller allowing main programs to be loaded, in a common way, irrespective of the types of hard disk drives, from respective disks provided in the hard disk drives, and to provide a hard disk controller and a hard disk drive to which the method is applied, and a control program for a hard disk controller.

In other words, the object of the present invention is to make it possible to install a common boot program in hard disk controllers which adapt to respective hard disk drive of various types that are assumed to operate at different rotation speeds.

It is another object of the present invention to realize a hard disk controller capable of loading, irrespective of types of hard disk drives, main programs from disks provided in the respective hard disk drives, and also to realize a hard disk drive including such a hard disk controller.

It is still another object of the present invention to eliminate a need to develop a new boot program every time the rotation speed of a disk is increased.

It is yet another object of the present invention led from the above to also eliminate the cost required for inspection of a disk controller LSI that has been a conventionally necessary work along with the development of the new boot program.

Thus, it is a final object of the present invention led from the above to greatly reduce the cost required for the development of a hard disk controller and a hard disk drive.

The above-described objects are achieved by a program boot method for a hard disk controller which boots by loading a main program to operate a hard disk drive, the method comprising: a motor activating step of increasing a rotation speed of a disk provided in the hard disk drive to a common rotation speed adapting to all types of hard disk drives; a head activating step of moving a magnetic head for accessing data recorded on the disk to a system area, of the disk, where the main program is recorded at the common rotation speed and a common recording density which adapts to all types of hard disk drive; a loading step of reading the main program from the system area while moving the magnetic head in accordance with the common recording density, and writing the main program to a RAM provided in a hard disk controller; a handover step of handing over control processing of the hard disk drive to the main program; and a speed adjustment step of increasing the rotation speed of the disk from the common rotation speed to a proper rotation speed for a device to be applied to the hard disk drive in a normal operation state.

In such a program boot method for a hard disk controller, processings in association with the differences among types of hard disk drives are performed in the speed adjustment step as a part of the main program. Processings are divided into ones irreverent to characteristics of the hard disk drive, which are included in the boot program and, and ones inherent to the individual hard disk drives, which are included in the main program, thereby allowing one boot program to be applied to a plurality of types of hard disk drives with different performances.

The above-described objects are achieved by a program boot method for a hard disk controller which boots by loading a main program to operate a hard disk drive, the method comprising: a servo data recording step of recording servo controlling data corresponding to a common rotation speed and a common recording density in a system area, of a disk, where the main program is to be recorded, the disk being provided in the hard disk drive, the common rotation speed and common recording density both adapting to all types of hard disk drive; a program recording step of recording the main program in the system area at the common rotation speed and recording density; a motor activating step of increasing a rotation speed of the disk to the common rotation speed; a head activating step of moving to the system area a magnetic head for accessing data recorded on the disk; a loading step of reading the main program from the system area while moving the magnetic head based on the servo controlling data, and writing the main program to a RAM provided in a hard disk controller; a handover step of handing over control processing of the hard disk drive to the main program; and a speed adjustment step of increasing the rotation speed of the disk from the common rotation speed to a proper rotation speed for a device to be applied to the hard disk drive in a normal operation state.

In such a program boot method for a hard disk controller, the main program is recorded based on the servo controlling data corresponding to the common rotation speed and common recording density, so that the main program can be read from the disk through processings not in association with characteristics of individual hard disk drives. Further, processings inherent to individual hard disk drives are performed not in the boot program but in the speed adjustment step included in the main program, thereby allowing one boot program to be applied to a plurality of types of hard disk drives with different performances.

The above-described objects are achieved by a hard disk controller comprising: a boot unit for loading from a disk a main program required to operate a hard disk drive; a normal operation unit for controlling a general operation of the hard disk drive according to the loaded main program; and an operation setup unit for initiating operation of the normal operation unit. The boot unit includes: an initial rotation activating unit for activating a spindle motor to increase a rotation speed of the disk to a common rotation speed which adapts to all types of hard disk drive; an initial positioning unit for moving to a system area, of the disk, where the main program is recorded, a magnetic head for accessing data recorded on the disk; and a loading unit for loading the main program from the system area while moving the magnetic head based on servo controlling data recorded in the system area, and giving the main program to the operation setup unit; and the normal operation unit includes a speed adjustment unit for controlling the spindle motor to allow the rotation speed of the disk to match with a rotation speed suitable for a normal operation state.

In such a hard disk controller, processings which depend on the type of hard disk drive and are included in setup processing for the full-scale operation of the hard disk drive, are performed not in the boot unit but in the normal operation unit, so that hard disk controllers can be configured using the same boot unit irrespective of the type of hard disk drive. In other words, it is possible to commonly use the boot program for implementing the boot unit with different types of hard disk drive.

Further, one of the above-described objects is achieved by a hard disk drive including: a disk recording thereon a main program required to operate the hard disk drive; and a hard disk controller having a boot unit for loading the main program from the disk, a normal operation unit for controlling an operation of the hard disk drive according to the loaded main program, and an operation setup unit for initiating operation of the normal operation unit, wherein: the disk includes a system area recording therein the main program based on servo controlling data corresponding to a common rotation speed and a common recording density both of which adapt to all types of hard disk drive; the boot unit provided in the hard disk controller includes: an initial rotation activating unit for activating a spindle motor to increase a rotation speed of the disk to the common rotation speed which adapts to all types of hard disk drive; an initial positioning unit for moving to the system area of the disk a magnetic head for accessing data recorded on the disk; and a loading unit for loading the main program from the system area while moving the magnetic head based on the servo controlling data, and giving the main program to the operation setup unit; and the normal operation unit provided in the hard disk controller includes: a speed adjustment unit for controlling an operation of the spindle motor to allow the rotation speed of the disk to match with a rotation speed suitable for a normal operation state of the hard disk.

In such a hard disk drive, the main program is recorded in the system area of the disk according to the servo controlling data corresponding to the common rotation speed, thereby allowing the main program to be loaded into the hard disk controller through processing independent of the type of the hard disk drive, so that boot units can be formed using the same boot program irrespective of the type of hard disk drive.

Further, one of the above-described objects is achieved by a control program for a hard disk controller, the program including a main program for operating a hard disk drive, and a boot program for loading the main program recorded on a disk into a hard disk controller. The boot program causes the hard disk controller to execute a processing which comprises the steps of: increasing a rotation speed of the disk provided in the hard disk drive to a common rotation speed which adapts to all types of hard disk drive; moving to a system area, of the disk, in which the main program is recorded, a magnetic head for accessing data recorded on the disk; reading the main program from the system area while moving the magnetic head on the assumption that the main program is to be recorded at the common rotation speed and a common recording density which adapts to all types of hard disk drive, and writing the main program to a RAM provided in the hard disk controller; and handing over control processing of the hard disk drive to the main program. And the main program causes the hard disk controller to execute a processing which comprises the step of increasing the rotation speed of the disk from the common rotation speed to a proper rotation speed for a device to be applied to the hard disk drive in a normal operation state.

In such a control program for a hard disk controller, the differences in processing resulting from different types of hard disk drives are included only in the speed adjustment step of the main program, and processing, of program boot processing of a hard disk controller, not in association with characteristics of the hard disk drive is included in the boot program, thereby allowing one boot program to be applied to a plurality of types of hard disk drives with different performances.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENT

[Principle]

First, the principle of a program boot method for a hard disk controller according to the present invention is described.

Figure 1A:
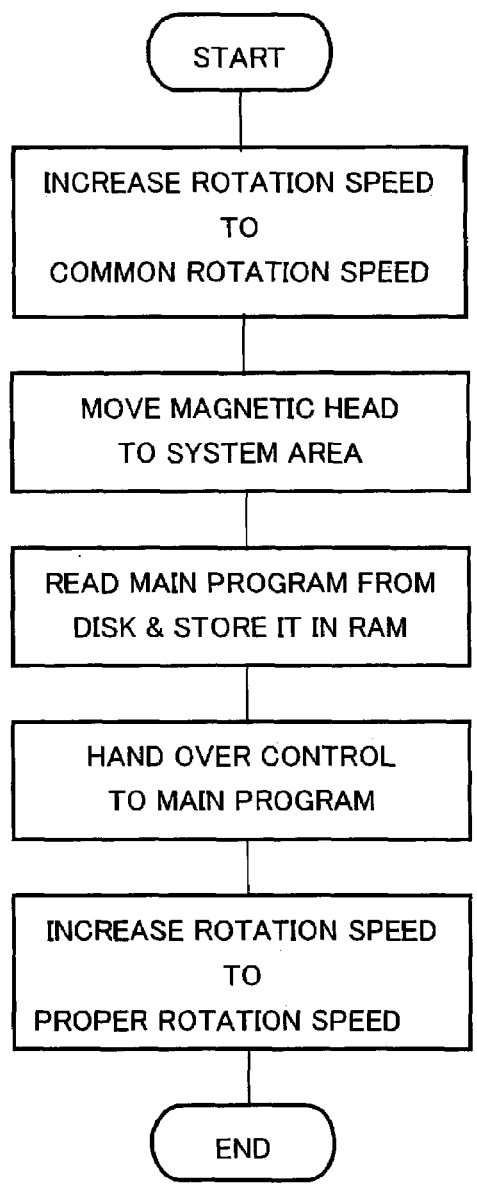
FIGS. 1(A) and 1(B) are flowcharts showing the principle of program boot methods according to the present invention.

FIG. 1A shows the principle of a first program boot method for a hard disk controller according to the present invention.

The program boot method for a hard disk controller shown in FIG. 1A comprises a motor activating step, a head activating step, a loading step, a handover step, and a speed adjustment step.

The principle of the first program boot method for a hard disk controller according to the present invention is as follows:

The motor activating step is a step of increasing the rotation speed of a disk provided in a hard disk drive to a rotation speed both common to all types of hard disk drive. The head activating step is a step of moving a magnetic head for accessing data recorded on the disk, to a system area in the disk where a main program is recorded at the common rotation speed and a recording density common to all types of hard disk drive. The loading step is a step of reading the main program from the system area while moving the magnetic head in accordance with the common recording density, and writing the main program to a RAM provided in the hard disk controller. The handover step is a step of handing over control processing of the hard disk drive to the main program. The speed adjustment step is a step of increasing the rotation speed of the disk from the common rotation speed to a proper rotation speed for a device to be applied to the hard disk drive in the normal operation state.

The operation in the first program boot method for a hard disk controller thus configured is as follows:

In the motor activating step, for example, the rotation speed of the disk is increased to the common rotation speed implementable by any type of hard disk drive, and, in the head activating step the magnetic head is moved to the system area. Thereafter, in the loading step, the main program is read from the system area provided in the disk and stored in the RAM in the hard disk controller. In the handover step, the control processing is handed over to the main program, and thereafter, in the speed adjustment step, the rotation speed of the disk is increased from the common rotation speed to a proper rotation speed for to be applied to the hard disk drive in the normal operation state.

Figure 1B:
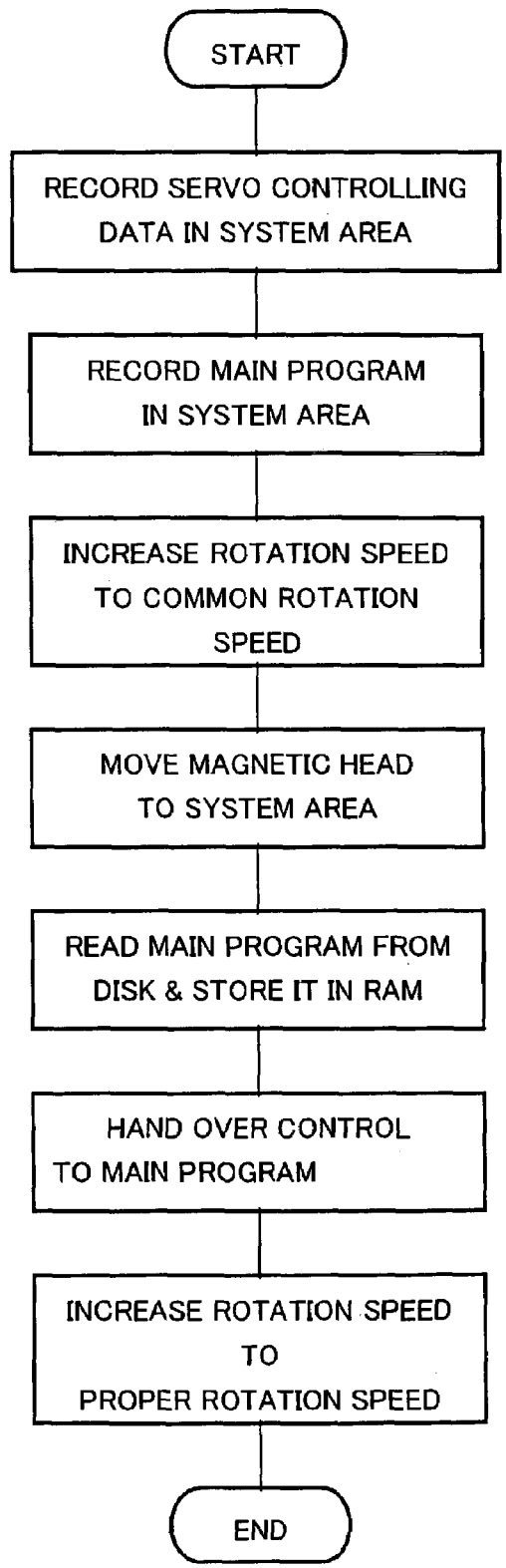

A second program boot method for a hard disk controller shown in FIG. 1B comprises a servo data recording step, a program recording step, a motor activating step, a head activating step, a loading step, a handover step, and a speed adjustment step.

The principle of the second program boot method for a hard disk controller according to the present invention is as follows:

The servo data recording step is a step of recording, in a system area, of a disk in a hard disk drive, where a main program is to be recorded, servo controlling data corresponding to a common rotation speed and a common recording density to all types of hard disk drive. The program recording step is a step of recording in the system area a main program for operating the hard disk drive at the common rotation speed and recording density. The motor activating step is a step of increasing the rotation speed of the disk to the common rotation speed. The head activating step is a step of moving to the system area a magnetic head for accessing data recorded on the disk. The loading step is a step of reading the main program from the system area while moving the magnetic head based on the servo controlling data, and writing the main program to a RAM provided in the hard disk controller. The handover step is a step of handing over control processing of the hard disk drive to the main program. The speed adjustment step is a step of increasing the rotation speed of the disk from the common rotation speed to a proper rotation speed for a device to be applied to the hard disk drive in the normal operation state.

The operation in the second program boot method for a hard disk controller thus configured is as follows:

In manufacturing the hard disk drive, for example, the servo data recording step is executed to record in the system area the servo controlling data corresponding to the common rotation speed and common recording density both of which adapt to all types of hard disk drive. Based on the servo controlling data, the main program is recorded in the system area in the program recording step. When booting the hard disk drive, the main program is read from the system area provided in the disk at the common rotation speed, and is stored in the RAM inside the hard disk controller, in a similar manner to the above-described first program boot method. In addition, servo controlling data corresponding to a rotation speed and a recording density to be applied in the normal operation state of each hard disk drive is recorded in a recording area other than the above system area, and the rotation speed of the disk is accelerated from the common rotation speed to a proper rotation speed for a device in the speed adjustment step after the main program takes over the control processing, which make it possible for the hard disk drive to fully operate with its expected level of performance.

Figure 2:
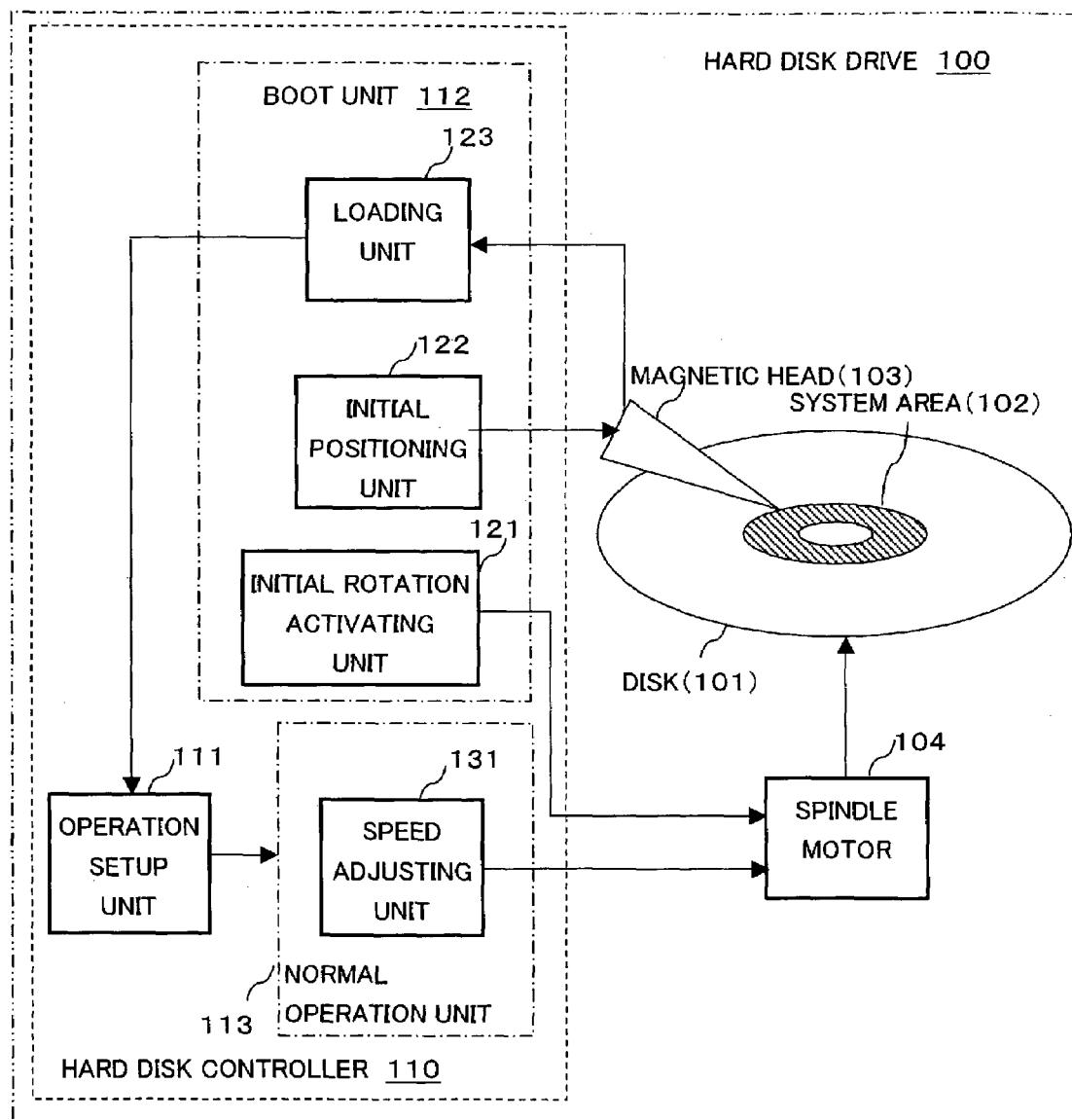
FIG. 2 shows the principle of a hard disk controller according to the present invention.

FIG. 2 shows a principle block diagram of a hard disk drive including a hard disk controller according to the present invention.

The hard disk controller shown in FIG. 2 comprises a boot unit 112 including an initial rotation activating unit 121, an initial positioning unit 122, a loading unit 123, and a normal operation unit 113 including a speed adjustment unit 131.

The principle of the hard disk controller according to the present invention is as follows:

In the boot unit 112 provided in a hard disk controller 110, the initial rotation activating unit 121 activates a spindle motor 104 to increase the rotation speed of a disk 101 to a common rotation speed to all types of hard disk drive. Further, in the boot unit 112, the initial positioning unit 122 moves a magnetic head 103 for accessing data recorded on the disk 101, to a system area 102, in the disk 101, where a main program is recorded. Furthermore, in the boot unit 112, the loading unit 123 loads the main program from the system area 102 while moving the magnetic head based on servo controlling data recorded in the system area 102, and passes the main program to an operation setup unit 111. Besides, in the normal operation unit 113 provided in the hard disk controller, the speed adjustment unit 131 controls the spindle motor 104 to allow the rotation speed of the disk 101 to match with a rotation speed suitable for the normal operation state.

The operation of the hard disk controller thus configured is as follows:

With the rotation speed of the disk 101 increased to the common rotation speed by the initial rotation activating unit 121 provided in the boot unit 112, the initial positioning unit 122 moves the magnetic head 103 to the system area 102. When the main program has been recorded according to the servo controlling data corresponding to the common rotation speed in this system area 102, the loading unit 123 can execute normal read processing from the system area 102 according to the servo controlling data, thereby completing the loading of a main program specific to a hard disk drive 100. In compliance with the main program thus loaded, the operation setup unit 111 then forms the normal operation unit 113 including the speed adjustment unit 131. The speed adjustment unit 131 adjusts, or accelerates, the rotation speed of the disk 101 to a proper rotation speed for a device to be applied to the hard disk drive 100 in the normal operation state, thereby setting up the hard disk drive 100 to be operable with its expected level of performance.

The hard disk drive shown in FIG. 2 comprises the disk 101 and the hard disk controller 110 including the operation setup unit 111, the boot unit 112, and the normal operation unit 113.

The principle of the hard disk drive according to the present invention is as follows:

The disk 101 stores thereon the main program required for operation of the hard disk drive 100. The hard disk controller 110 allows the boot unit 112 to load the main program from this disk 101, and the operation setup unit 111 to form the normal operation unit 113 for controlling the operation of the hard disk drive 100 based on the main program. In the above-described disk 101, the system area 102 has the main program recorded therein based on the servo controlling data corresponding to the common rotation speed and recording density to all types of hard disk drive. In the boot unit 112 provided in the hard disk controller 110, the initial rotation activating unit 121 activates the spindle motor 104 to increase the rotation speed of the disk 101. Further, in the boot unit 112, the initial positioning unit 122 moves to the system area 102 in the disk 101 the magnetic head 103 for accessing the data recorded on the disk 101. Furthermore, in the boot unit 112, the loading unit 123 loads the main program from the system area 102 while moving the magnetic head 103 based on the servo controlling data, and passes the main program to the operation setup unit 111. In the normal operation unit 113 provided in the hard disk controller 110, the speed adjustment unit 131 controls the operation of the spindle motor 104 to have the rotation speed of the disk 101 match with a rotation speed suitable for the normal operation state.

The operation of the hard disk drive thus configured is as follows:

In the system area 102 provided in the disk 101, the main program is recorded based on the servo controlling data corresponding to the common rotation speed and common recording density. Therefore, the initial rotation activating unit 121 provided in the boot nit 112 increases the rotation speed of the disk 101 to the common rotation speed, and the loading unit 123 executes normal loading processing based on the servo controlling data after the initial positioning unit 122 moves the magnetic head 103 to the system area 102, thereby enabling loading of a main program specific to the hard disk drive 100. Based on the main program thus loaded, the operation setup unit 111 then forms the normal operation unit 113 including the speed adjustment unit 131. The speed adjustment unit 131 accelerates the rotation speed of the disk 101 to a proper rotation speed for a device to be applied to the hard disk drive 100 in the normal operation state, thereby completing a boot operation of the hard disk drive 100 to be operable with its expected level of performance.

A control program for a hard disk controller comprises a boot program including a motor activating step, a head activating step, a loading step, and a handover step, and a main program including a speed adjustment step. The control program corresponds to the program boot method for a hard disk controller shown in FIG. 1A, The principle of the control program for a hard disk controller according to the present invention is as follows:

In the boot program of the control program for a hard disk controller, the motor activating step is a step of increasing the rotation speed of a disk provided in a hard disk drive to a common rotation speed to all types of hard disk drive. The head activating step is a step of moving a magnetic head for accessing data recorded on the disk, to a system area in the disk where a main program is recorded. Further, the loading step is a step of reading the main program from the system area while moving the magnetic head, on the assumption that the main program is to be recorded at the common rotation speed and a common recording density to all types of hard disk drive, and of writing the main program to a RAM provided in the hard disk controller. Furthermore, the handover step is a step of handing over control processing of the hard disk drive to the main program. The speed adjustment step of the main program is a step of increasing the rotation speed of the disk from the common rotation speed to a proper rotation speed for a device to be applied to the hard disk drive in the normal operation state.

The operation in the control program for a hard disk controller thus configured is as follows:

In the motor activating step of the boot program, for example, the rotation speed of the disk is accelerated to the common rotation speed implementable by any type of hard disk drive, and, in the head activating step, the magnetic head is moved to the head of the system area. If the main program is recorded in this system area at the common rotation speed and common recording density, the main program can be loaded in the subsequent loading step. Then, in the handover step, the main program takes over the control processing. Thereafter, in the speed adjustment step of the main program, the rotation speed of the disk is accelerated from the common rotation speed to a rotation speed specific to a device, thereby allowing the hard disk drive to fully operate.

Embodiments

Next, specific configurations of a hard disk controller and a hard disk drive according to the present invention are described.

Referring to the drawings, embodiments of the present invention are described in detail hereinafter.

Figure 3:
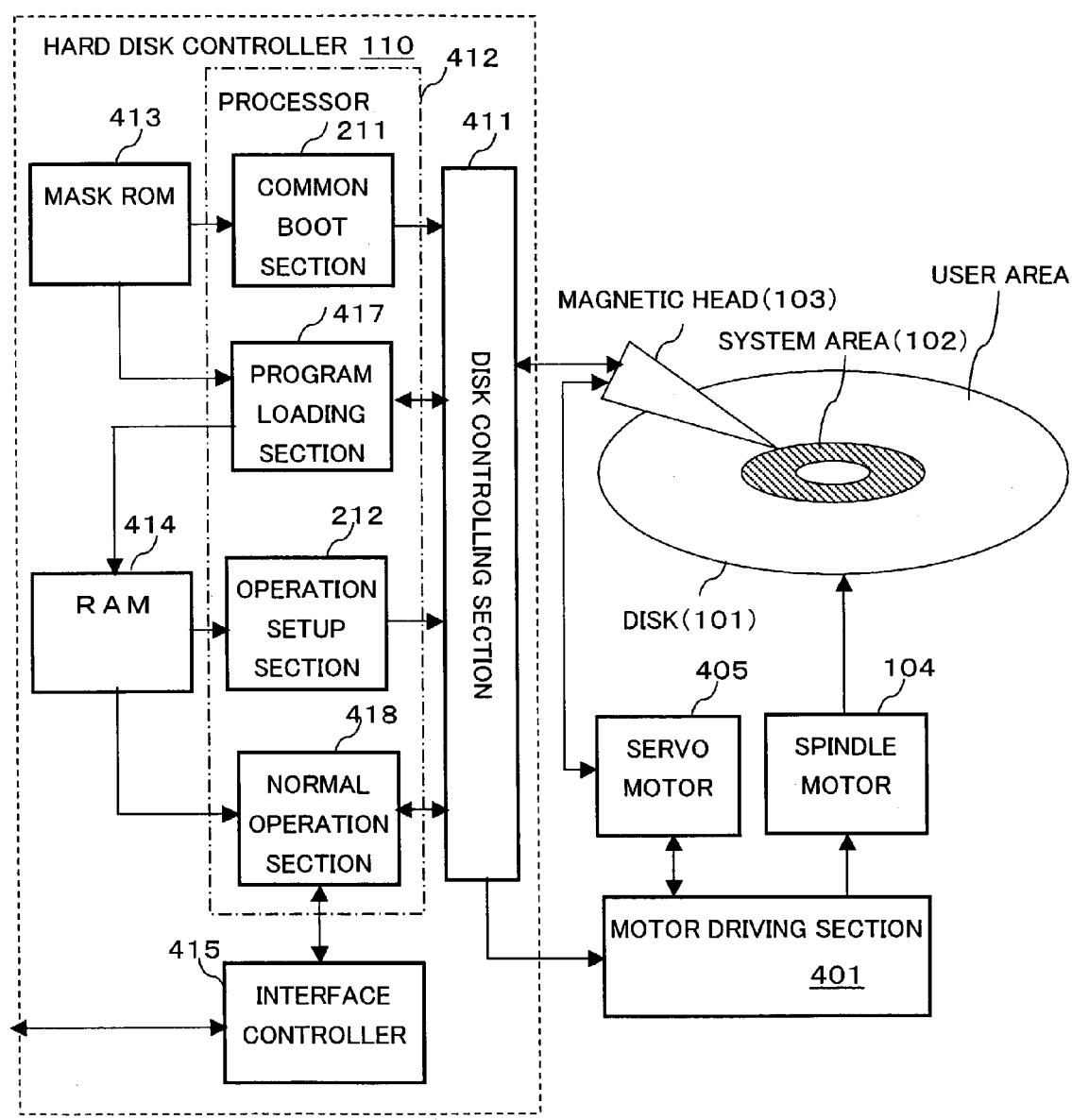
FIG. 3 is a diagram showing an embodiment of a hard disk drive according to the present invention.
Figure 4:
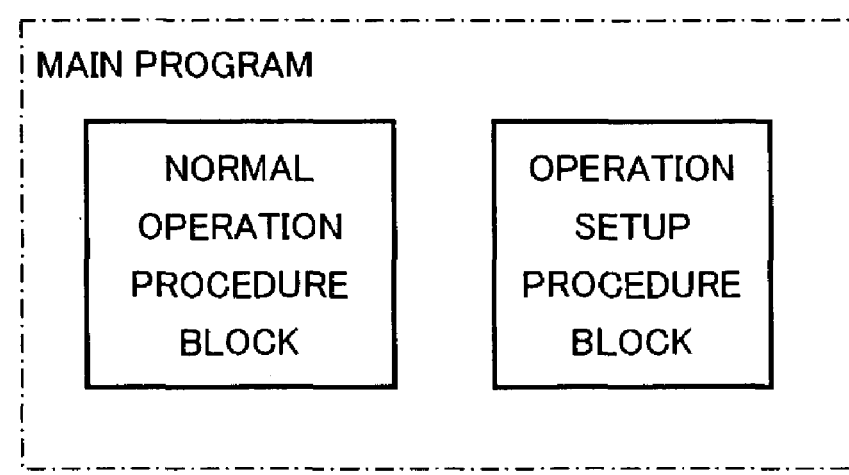
FIGS. 4(A) and 4(B) are diagrams showing configurations of a boot program and a main program according to the present invention.
Figure 4:
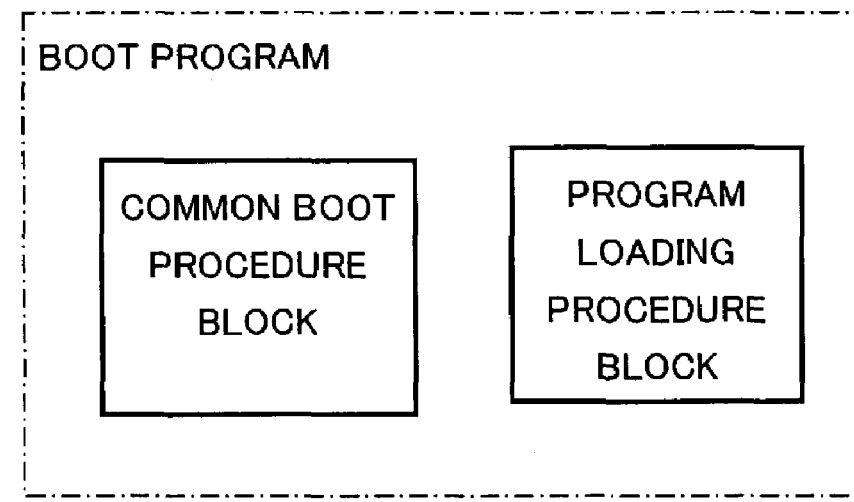

FIG. 3 shows an embodiment of the hard disk drive according to the present invention. Besides, FIG. 4 shows configurations of a boot program and a main program according to the present invention.

Figure 6:
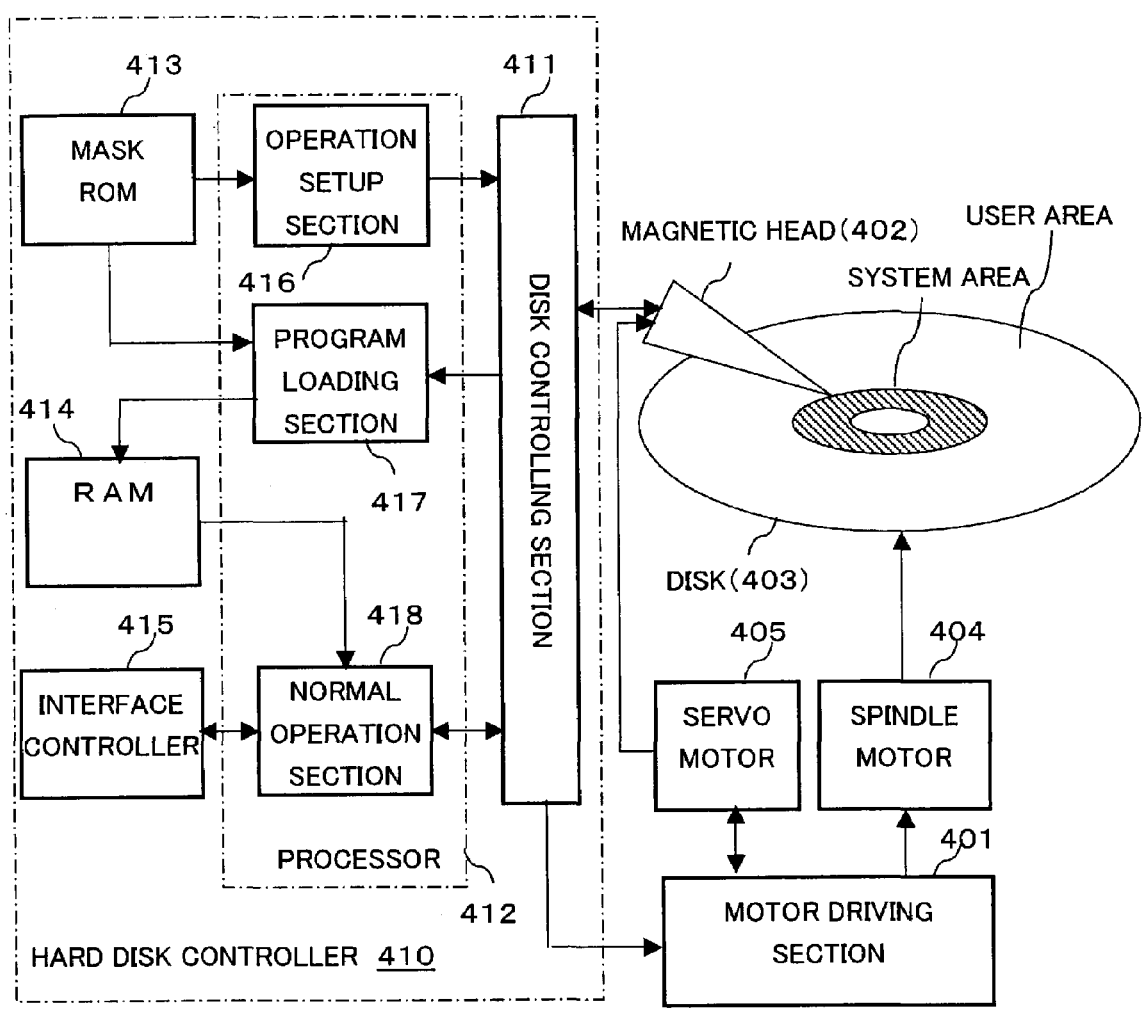
FIG. 6 is a diagram showing an example of a general configuration of a hard disk controller.

Note that components shown in FIG. 3 equivalent to those shown in FIG. 6 are assigned the same reference numbers as those in FIG. 6, and the description thereof is omitted.

A disk 101 provided in a hard disk drive shown in FIG. 3 is divided into a system area and a user area. In the system area 102, common servo controlling data is recorded which corresponds to a common rotation speed and a common recording density implementable in all hard disk drives. Further, in this system area 102, a main program suited to the hard disk drive is recorded in accordance with the above-described common servo controlling data. This main program includes, as shown in FIG. 4A, a normal operation procedure block for implementing a normal operation section 418 similar to that in the prior art and, additionally, an operation setup procedure block for adjusting the rotation speed of the disk 101 to a rotation speed of the hard disk drive in operation.

Meanwhile, in a hard disk controller 110 shown in FIG. 3, a mask ROM 413 stores therein a boot program including a later-described common boot procedure block and program loading procedure block (see FIG. 4B). This common boot procedure block is a procedure performed from power supply to the hard disk drive to completion of the acceleration of the rotation speed of the disk 101, that is, until it reaches the above common rotation speed. A processor 412 operates in accordance with this common boot procedure block to thereby implement a common boot section 211 shown in FIG. 3. The program loading procedure block is the same as that included in the boot program of the prior art. Therefore, the processor 412 operates in accordance with this program loading procedure block to implement a program loading section 417 shown in FIG. 3.

An operation setup section 212 shown in FIG. 3 is implemented by the processor 412's operation, after a main program is stored in a RAM 414, in accordance with the operation setup procedure block included in the main program.

The relation between the respective sections shown in FIG. 3 and the respective units shown in FIG. 2 is described here.

The common boot section 211 shown in FIG. 3 corresponds to the initial rotation activating unit 121 and the initial positioning unit 122 shown in FIG. 2. The loading unit 123 shown in FIG. 2 is implemented by the program loading section 417 and the RAM 414 shown in FIG. 3. The operation setup section 212 shown in FIG. 3 corresponds to the speed adjustment unit 131 shown in FIG. 2. A spindle motor 404 shown in FIG. 3 corresponds to the spindle motor 104 shown in FIG. 2. The operation setup unit 111 shown in FIG. 2 is implemented by the processor 412's starting execution of the main program stored in the RAM 414 in accordance with a branch instruction or the like included in the boot program which is stored in the mask ROM 413 shown in FIG. 3. The boot unit 112 shown in FIG. 2 is implemented by the same processor 412 shown in FIG. 3 controlling, via a disk controlling section 411, a motor driving section 401 in accordance with the boot program stored in the mask ROM 413 shown in FIG. 3 and receiving data read with the magnetic head 103. Similarly, the normal operation unit 113 shown in FIG. 2 is implemented by the processor 412 controlling, via the disk controlling section 411, the motor driving section 401 in accordance with the main program stored in the RAM 414 shown in FIG. 3 and sending and receiving data to and from the magnetic head 103. Note that the disks 101 and the magnetic heads 103 shown in FIG. 2 and FIG. 3 are equivalent to the disk 403 and the magnetic head 402 shown in FIG. 6, respectively.

Next, the operation of the hard disk drive shown in FIG. 3 is described.

Figure 5:
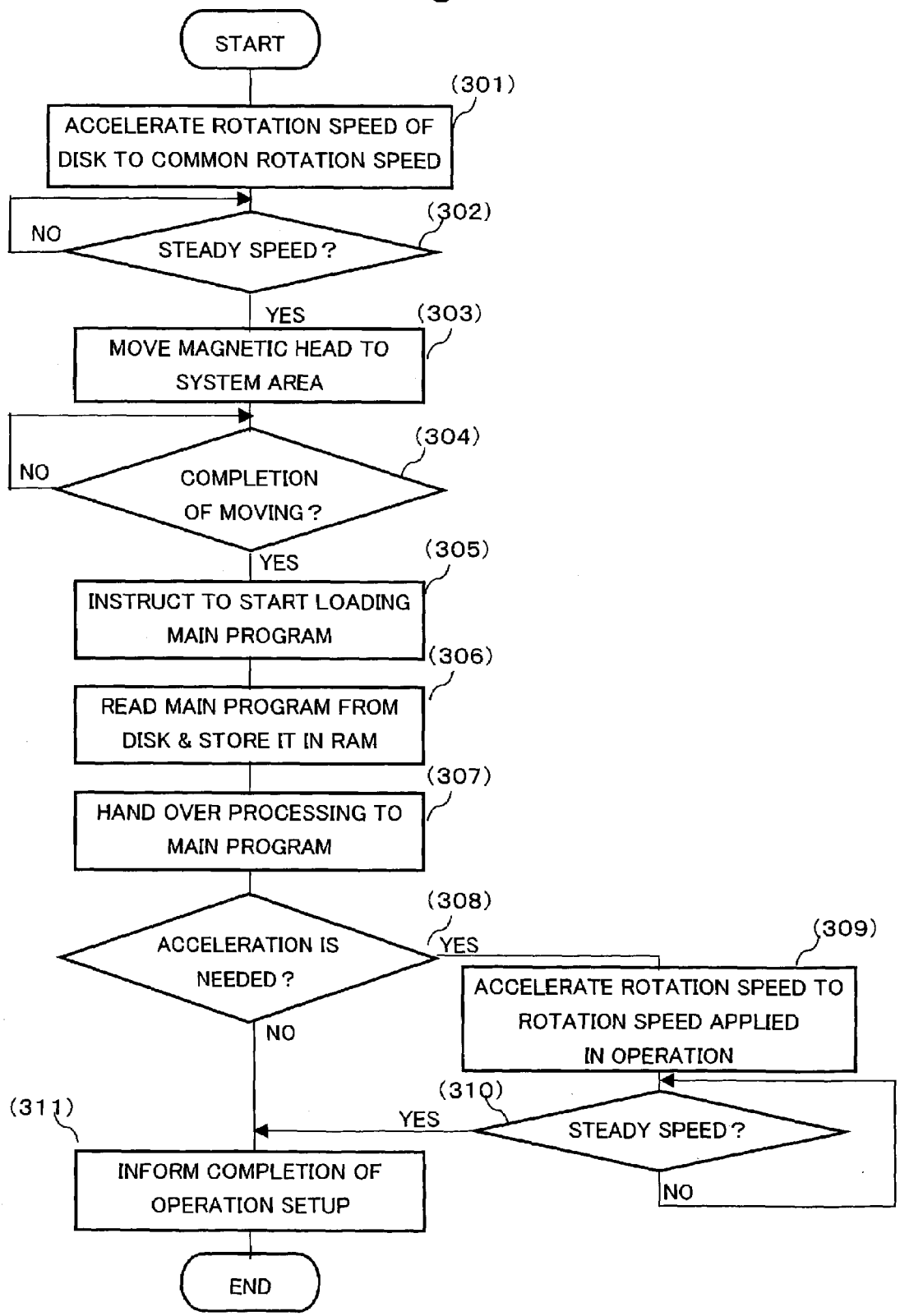
FIG. 5 is a flowchart representing the operation of booting the hard disk drive.

FIG. 5 shows a flowchart representing the operation of booting the hard disk drive.

Upon application of power to the hard disk drive, the common boot section 211 shown in FIG. 3 first instructs the disk controlling section 411 to activate the spindle motor 404 and to accelerate the rotation speed of the spindle motor 404 to the common rotation speed (for example, 5400 rpm) (Step 301).

Thereafter, the common boot section 211 repeats Step 302 and waits for stabilization of the rotation speed of the disk 101. Then, when notified, via the disk controlling section 411, of the fact that the spindle motor 404 now steadily drives at the above-described common rotation speed, the common boot section 211 determines as an affirmative judgment of Step 302 that the spindle motor 404 has completed the acceleration, and proceeds to Step 303. Then, the common boot section 211 instructs the disk controlling section 411 to move the magnetic head 103 to the head of the system area 102 provided in the disk 101.

Thereafter, the common boot section 211 repeats Step 304 and waits for completion of the moving of the magnetic head 103. When notified, via the disk controlling section 411, of the fact that the magnetic head 103 has been moved to the head of the above-described system area 102, the common boot section 211 affirmatively judges Step 304 and proceeds to Step 305, and instructs the program loading section 417 to start the operation of loading the main program.

The program loading section 417 receives, via the disk controlling section 411, data representing the main program read from the system area 102 by the magnetic head 103, and stores the main program in the RAM 414 (Step 306). Then, upon completion of the loading of the main program, the program loading section 417 hands over processing to the operation setup section 212, for example, by executing a branch instruction to a head address of an area of the RAM 414 where the main program is stored (Step 307).

This operation setup section 212 first compares a rotation speed to be applied in an operation indicated by the data included in the main program with the above-described common rotation speed, and judges based on the comparison result whether or not the rotation speed needs to be changed (Step 308). In the case where an affirmative judgment has been obtained in Step 308, the operation setup section 212 instructs the disk controlling section 411 to accelerate the rotation speed of the spindle motor 404 to the rotation speed in the above operation (for example, 15000 rpm) (Step 309).

Thereafter, the operation setup section 212 repeats Step 310 and waits for stabilization of the rotation speed of the disk 101. Then, when notified, via the disk controlling section 411, of the fact that the rotation speed of the spindle motor 404 now steadily drives at the above rotation speed to be applied in the operation, the operation setup section 212 proceeds to Step 311 as an affirmative judgment of Step 310, and informs the normal operation section 418 of the completion of the operation setup, thereby ending the boot processing.

On the other hand, when the rotation speed to be applied in the operation matches with the above-described common rotation speed, the operation setup section 212 determines that the rotation speed does not need to be changed (negative judgment in Step 308), and proceeds to Step 311 to inform the normal operation section 418 of the completion of the operation setup, thereby ending the boot processing.

After the boot processing thus ended, the normal operation section 418 accesses to a storage area of the disk 101 via the disk controlling section 411 in accordance with the operation control procedure block of the main program, similarly to the prior art, and also in response to an instruction inputted via an interface controller 415 from a host computer or the like.

As described above, in the hard disk drive according to the present invention, the main program is loaded with the disk 101 rotating at the common rotation speed implementable by all types of hard disk drives. This eliminates a need to include in boot programs data relevant to the type of individual hard disk drives. Consequently, a large number of boot programs for booting all types of hard disk drives can be integrated into just one.

In addition, a hard disk controller with the above boot program stored in a mask ROM thereof is applicable to hard disk drives to which any rotation speed is applied.

It is, of course, possible to singly provide the hard disk controller with the above boot program stored in a mask ROM thereof. Further, it is also possible to provide a control program for a hard disk drive which is a combination of the boot program including the above-described common boot procedure block and the main program including the operation setup procedure block.

The hard disk drive according to the present invention requires two procedures of loading the main program with the disk 101 rotating at a low speed, and of accelerating the speed to an expected rotation speed after completion of the loading. These requirements, however, do not increase the time taken to boot the hard disk drive much.

This is because, when the disk rotates at a low speed, the loading speed of the main program is lower, but it is highly probable compared with the disk rotating at a high speed that a single loading processing can complete the loading of the main program. More specifically, it can be expected that the hard disk controller to which the present invention is applied completes the loading processing of the main program in almost the same or, rather, shorter time than that taken to load the program with the disk rotating at a high speed in the conventional method, which requires repeated loading until completion.

Considered that the time taken for the loading of the main program does not change and that the time required to accelerate the rotation speed of the disk is not as long as about several hundreds of milliseconds, it is conceivable that a delay does not occur to the extent that users may recognize in the whole processing.

The invention is not limited to the above embodiments and various modifications may be made without departing from the spirit and scope of the invention. Any improvement may be made in part or all of the components.

What is claimed is:

1. A program boot method for a hard disk controller which loads a main program to boot in order to operate a hard disk drive at a unique rotation speed and a unique recording density appropriate for realizing a performance to be achieved by that type of hard disk drive, the method comprising the steps of:

increasing a rotation speed of a disk provided in said hard disk drive to a common rotation speed which adapts to all types of hard disk drives regardless of the unique rotation speed that corresponds to said that type of hard disk drive;

moving a magnetic head to a system area, of said disk, in which said main program is recorded at said common rotation speed and at a common recording density which adapts to all types of hard disk drives regardless of the unique rotation speed that corresponds to said that type of hard disk drive, the magnetic head accessing data recorded on said disk;

moving said magnetic head in accordance with said common recording density to read said main program from said system area, and writing said main program to a RAM provided in said hard disk controller;

handing over control processing of said hard disk drive to said main program; and increasing a rotation speed of said disk from said common rotation speed to said unique rotation speed for a device to be applied to said hard disk drive in a normal operation state.

2. A program boot method for a hard disk controller which loads a main program to boot in order to operate a hard disk drive at a unique rotation speed and a unique recording density appropriate for realizing a performance to be achieved by that type of hard disk drive, the method comprising the steps of:

recording servo controlling data corresponding to a common rotation speed and a common recording density in a system area, of a disk, in which said main program is to be recorded, the disk being provided in said hard disk drive, the common rotation speed and common recording density both adapting to all types of hard disk drives regardless of the unique rotation speed and the unique recording density that correspond to said that type of hard disk drive;

recording said main program in said system area at said common rotation speed and common recording density;

increasing a rotation speed of said disk to said common rotation speed;

moving to said system area a magnetic head for accessing data recorded on said disk;

moving said magnetic head according to said servo controlling data to read said main program from said system area, and writing said main program to a RAM provided in said hard disk controller;

handing over control processing of said hard disk drive to said main program; and increasing a rotation speed of said disk from said common rotation speed to said unique rotation speed for a device to be applied to said hard disk drive in a normal operation state.

3. A hard disk controller comprising a boot unit for loading from a disk a main program required to operate a hard disk drive at a unique rotation speed and a unique recording density appropriate for realizing a performance to be achieved by that type of hard disk drive, a normal operation unit for controlling a general operation of said hard disk drive according to the loaded main program, and an operation setup unit for initiating operation of the normal operation unit, wherein:

said boot unit comprises:

an initial rotation activating unit for activating a spindle motor to increase a rotation speed of said disk to a common rotation speed which adapts to all types of hard disk drive regardless of the unique rotation speed that corresponds to said that type of hard disk drive;

an initial positioning unit for moving a magnetic head to a system area, of said disk, in which said main program is recorded with said common rotation speed and common recording density, the magnetic head accessing data recorded on said disk; and a loading unit for moving said magnetic head according to servo controlling data corresponding to said common recording density recorded in said system area to load said main program from said system area, and for giving said main program to said operation setup unit; and said normal operation unit comprises a speed adjustment unit for controlling said spindle motor to allow said rotation speed of said disk to match with a rotation speed suitable for a normal operation state of said hard disk.

4. A hard disk drive comprising:

a disk on which a main program required to operate the hard disk drive, at a unique rotation speed and a unique recording density appropriate for realizing a performance to be achieved by that type of hard disk drive, is recorded; and a hard disk controller having a boot unit for loading said main program from said disk, a normal operation unit for controlling an operation of the hard disk drive according to the loaded main program, and an operation setup unit for initiating operation of the normal operation unit, wherein said disk comprises a system area in which said main program is recorded according to servo controlling data corresponding to a common rotation speed and a common recording density both of which adapt to all types of hard disk drive regardless of the unique rotation speed and the unique recording density that correspond to said that type of hard disk drive; and said boot unit provided in said hard disk controller comprises:

an initial rotation activating unit for activating a spindle motor to increase a rotation speed of said disk to said common rotation speed;

an initial positioning unit for moving a magnetic head to said system area of said disk, the magnetic head accessing data recorded on said disk; and a loading unit for moving said magnetic head according to said servo controlling data to load said main program from said system area, and giving said main program to said operation setup unit, wherein said normal operation unit provided in said hard disk controller comprises a speed adjustment unit for controlling an operation of said spindle motor to allow said rotation speed of said disk to match with said unique rotation speed suitable for a normal operation state of the hard disk.

5. A control program for a hard disk controller, the program comprising a main program for operating a hard disk drive having a unique rotation speed and a unique recording density appropriate for realizing a performance to be achieved by that type of hard disk drive and a boot program for loading said main program recorded on a disk into the hard disk controller, wherein said boot program causes the hard disk controller to execute a processing, the processing comprising the steps of:

increasing a rotation speed of said disk provided in said hard disk drive to a common rotation speed which adapts to all types of hard disk drive regardless of the unique rotation speed that corresponds to the type of hard disk drive;

moving a magnetic head to a system area, of said disk, in which said main program is recorded, the magnetic head accessing data recorded on said disk;

moving said magnetic head to read said main program from said system area on assumption that said main program is to be recorded at said common rotation speed and at a common recording density which adapts to all types of hard disk drive regardless of the unique rotation speed that corresponds to said that type of hard disk drive, and writing said main program to a RAM provided in said hard disk controller; and handing over control processing of said hard disk drive to said main programs;

wherein said main program causes the hard disk controller to execute a processing which comprises the step of increasing said rotation speed of said disk from said common rotation speed to a proper rotation speed for a device to be applied to said hard disk drive in a normal operation state.

* * * * *